United States Patent
Kwon (10) Patent No.: US 8,724,917 B2
(45) Date of Patent: May 13, 2014

(54) SELECTING BEST IMAGE AMONG SEQUENTIALLY CAPTURED IMAGES

(75) Inventor: Sung Jin Kwon, Gyeonggi-Do (KR)

(73) Assignee: Core Logic Inc., Seoul (KR)

( * ) Notice: Subject to any disclaimer, the term of this patent is extended or adjusted under 35 U.S.C. 154(b) by 929 days.

(21) Appl. No.: 12/427,582

(22) Filed: Apr. 21, 2009

(65) Prior Publication Data
US 2009/0263028 A1   Oct. 22, 2009

(30) Foreign Application Priority Data

Apr. 21, 2008   (KR) .................. 10-2008-0036747

(51) Int. Cl.
G06K 9/40   (2006.01)

(52) U.S. Cl.
USPC ........ 382/254; 382/162; 382/224; 348/222.1; 348/356

(58) Field of Classification Search
USPC ............... 382/162, 224, 254; 348/222.1, 356
See application file for complete search history.

(56) References Cited

U.S. PATENT DOCUMENTS

| 5,363,209 A * | 11/1994 | Eschbach et al. ............. 358/445 |
| 5,594,503 A * | 1/1997 | Miyazawa ................. 348/414.1 |
| 5,877,504 A * | 3/1999 | Yanagita et al. ........... 250/484.4 |
| 6,304,269 B1 * | 10/2001 | Ito ................................. 345/589 |
| 7,688,379 B2 * | 3/2010 | Forman et al. ................ 348/356 |
| 2003/0068100 A1 | 4/2003 | Covell et al. |
| 2003/0151674 A1 | 8/2003 | Lin |
| 2004/0119875 A1 | 6/2004 | Hayaishi et al. |
| 2005/0219362 A1 | 10/2005 | Garoutte |
| 2006/0139461 A1 | 6/2006 | Matsui et al. |
| 2007/0103551 A1 | 5/2007 | Kim et al. |
| 2007/0132874 A1 | 6/2007 | Forman et al. |
| 2008/0158430 A1 * | 7/2008 | Hu ................................. 348/672 |

FOREIGN PATENT DOCUMENTS

| KR | 10-0669251 B1 | 1/2007 |
| KR | 10-2007-0049833 A | 5/2007 |

OTHER PUBLICATIONS

Fisher et al. "Sobel Edge Detector"; 1994, Department of Artificial Intelligence, University of Edinburgh, UK.*

* cited by examiner

*Primary Examiner* — Chan Park
*Assistant Examiner* — Eueng-nan Yeh
(74) *Attorney, Agent, or Firm* — Lowe Hauptman & Ham, LLP (57) ABSTRACT

Techniques, apparatus and systems are described for selecting the recommended image among sequentially captured images. In aspect, a method of selecting the recommended image includes measuring a brightness value and a sharpness value for each of sequentially captured images. The measured brightness and sharpness values are combined for each image to obtain a combined value for each image. The recommended image is selected from among the sequentially captured images based on the obtained combined values.

10 Claims, 6 Drawing Sheets

FIG. 7

SELECTING BEST IMAGE AMONG SEQUENTIALLY CAPTURED IMAGES

CLAIM OF PRIORITY

This application claims the benefit of Korean Patent Application No. 10-2008-0036747, filed on Apr. 21, 2008, in the Korean Intellectual Property Office, the disclosure of which is incorporated herein in its entirety by reference.

BACKGROUND

The present disclosure relates to selecting an image

A digital camera is a type of camera that stores a photographed image in an internal memory device. Whereas a general camera stores an image in an analog value, a digital camera divides an image into bitmaps, and stores the brightness of each bitmap as digital values. Recent popular digital cameras support a general photographing mode, wherein one image is captured by pressing a shutter button, and a continuous photographing mode, wherein several images are sequentially captured while pressing the shutter button. Generally, in the continuous photographing mode, static images of the same subject having continuity are obtained.

SUMMARY

The present disclosure provides a method of and apparatus for selecting an image, which accurately selects the best or recommended image from among a plurality of sequentially captured images, and a computer readable recording medium having recorded thereon a program for executing the method.

According to an aspect of the present disclosure, there is provided a method of selecting the best or recommended image from a plurality of images that are sequentially captured, the method including: measuring a brightness value for each of the plurality of images; measuring a sharpness value for each of the plurality of images; combining the measured brightness value for each of the plurality of images with the measured sharpness value for each of the plurality of images, respectively; and selecting the best or recommended image from among the plurality of images based on the combination values.

According to another aspect of the present disclosure, there is provided a computer readable recording medium having recorded thereon a program for executing a method of selecting the best or recommended image from a plurality of images that are sequentially captured, the method including: measuring a brightness value for each of the plurality of images; measuring a sharpness value for each of the plurality of images; combining the measured brightness value for each of the plurality of images with the measured sharpness value for each of the plurality of images, respectively; and selecting the best or recommended image from among the plurality of images based on the combination values.

According to another aspect of the present disclosure, there is provided an apparatus for selecting the best or recommended image from a plurality of images that are sequentially captured, the apparatus including: a brightness measuring unit that measures a brightness value for each of the plurality of images; a sharpness measuring unit that measures a sharpness value for each of the plurality of images; a combination unit that combines the measured brightness value for each of the plurality of images with the measured sharpness value for each of the plurality of images, respectively; and a selection unit that selects the best or recommended image from among the plurality of images based on the combination values.

The techniques, apparatus and systems described in this specification can optionally provide one or more of the following advantages. For example, the best or recommended image is selected to have minimal error due to noise, motion of a subject, and brightness change inside and outside a camera.

BRIEF DESCRIPTION OF THE DRAWINGS

Like reference numerals in the drawings denote like elements

DETAILED DESCRIPTION

Figure 1:
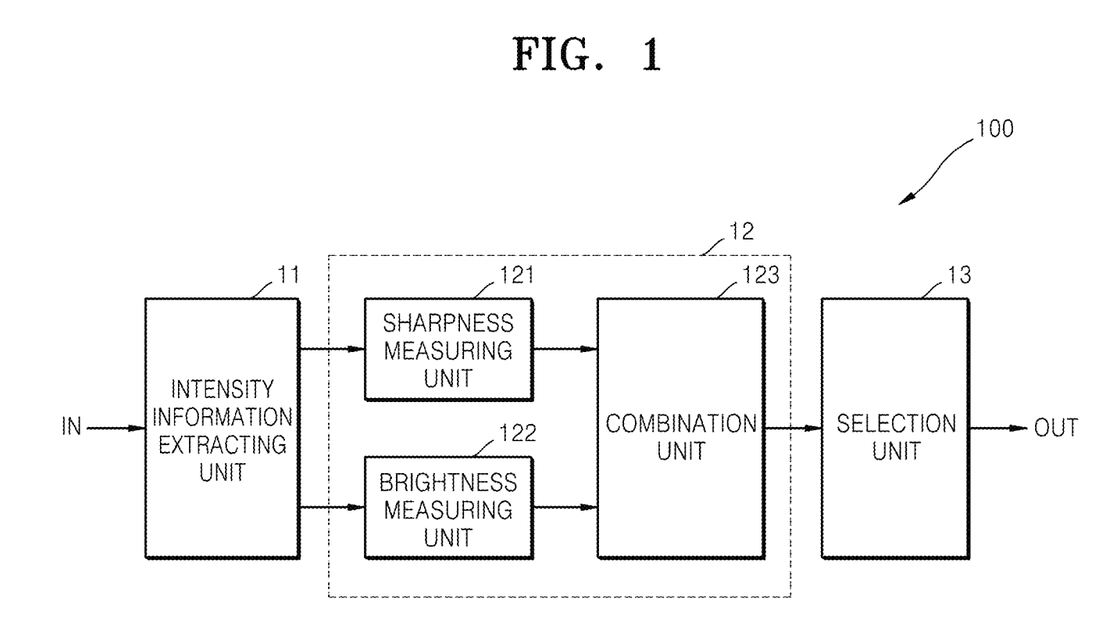
FIG. 1 is a block diagram of an apparatus for selecting the best or recommended image, according to an embodiment of the present disclosure.

FIG. 1 is a block diagram of an apparatus for selecting the best or recommended image, according to an embodiment of the present disclosure. Referring to FIG. 1, the apparatus 100 includes an intensity information extracting unit 11, an image quality measuring unit 12, and a selection unit 13.

The intensity information extracting unit 11 extracts intensity information of each of multiple images that are sequentially captured. Here, the multiple images represent N images that are sequentially captured, wherein N is a natural number greater than 1, and is predetermined in a continuous photographing mode of a camera. For images sequentially captured in the continuous photographing mode, qualities among the images may differ due to blurring caused by motion of a subject, a change in brightness inside or outside the camera, or blurring caused by shaking from a user holding the camera. Accordingly, the best or recommended image needs to be selected from among the N sequentially captured images.

The multiple images may be color images. Generally, a color image is divided into a Y component, indicating intensity information, and Cb and Cr components, indicating chrominance information. The Cb and Cr components are more sensitive to lighting conditions than the Y component. According to an embodiment of the present disclosure, because an algorithm is applied to images obtained in various environments, the intensity information extracting unit 11 extracts intensity information, which is relatively less sensitive to lighting conditions compared to chrominance information, so as to obtain a gray level image. In some implementations, the intensity information extracting unit 11 does not extract any other information. Also, overall processing speed of the apparatus is increased by using a Y component from among Y, Cb, and Cr components. In some implementations, the component used consists of Y component.

When the multiple images are in black and white, according to an embodiment, the apparatus may not include the intensity information extracting unit 11. Also, even when the multiple images are in color, according to another embodiment, the apparatus may not include the intensity information extracting unit 11 and may instead measure quality such as sharpness and brightness of each of the color images using the image quality measuring unit 12.

The image quality measuring unit 12 includes a sharpness measuring unit 121, a brightness measuring unit 122, and a combination unit 123, to measure the quality of each of multiple gray level images. The image quality measuring unit 12 receives the intensity information output from the intensity information extracting unit 11. The image quality measuring unit may not receive any other information.

The sharpness measuring unit 121 measures a sharpness value of an image having the intensity information, extracted by the intensity information extracting unit 11. The image may not have any other information. Here, the sharpness value represents clarity of an intensity boundary portion of the image, and includes detail, contrast, edge, etc.

The sharpness measuring unit 121 measures the sharpness value by detecting edges included in each of the multiple gray level images by applying a filter on each of the multiple gray level images. For example, the sharpness measuring unit 121 may detect edges included in each gray level image by applying a Sobel filter on each gray level image. Alternatively, the sharpness measuring unit 121 may use other filters, such as a Gaussian filter or a Laplacian filter. Hereinafter, the Sobel filter is applied for convenience of description.

Figure 2:
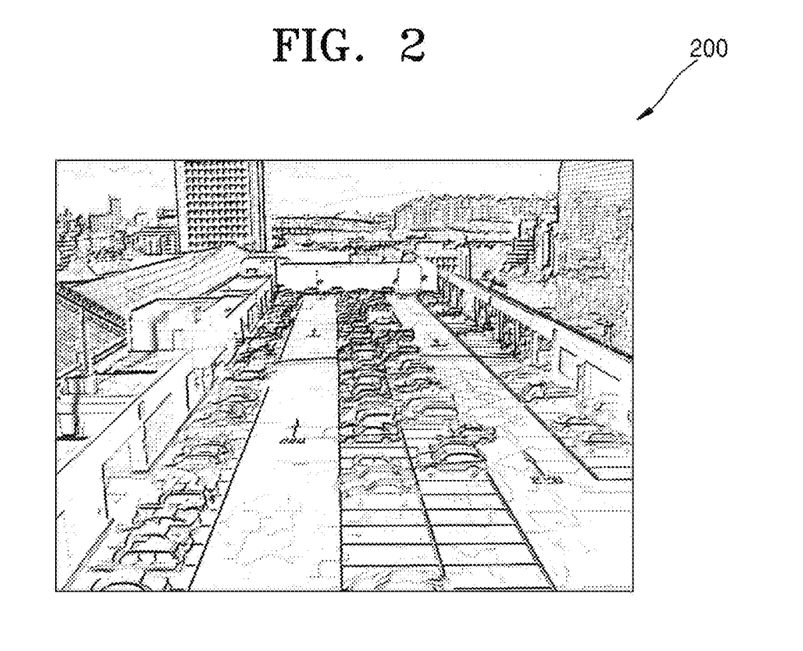
FIG. 2 is an image including edges detected by a sharpness measuring unit of FIG. 1, according to an embodiment of the present disclosure.

FIG. 2 is an example image including edges detected by the sharpness measuring unit 121 of FIG. 1, according to an embodiment of the present disclosure. Operations of the sharpness measuring unit 121 will now be described with reference to FIGS. 1 and 2.

Referring to FIGS. 1 and 2, the sharpness measuring unit 121 applies the Sobel filter on a gray level image 200, so as to detect the edge components included in the gray level image 200 as shown in FIG. 2. The detection may be limited to the edge components.

The Sobel filter includes differential operators Gx and Gy, and the differential operators Gx and Gy are respectively represented by Equations 1 and 2 below.

$$G_x = \begin{bmatrix} -1 & 0 & 1 \\ -2 & 0 & 2 \\ -1 & 0 & 1 \end{bmatrix} \quad (1)$$

First, the sharpness measuring unit 121 detects longitudinal edge components included in the gray level image by applying the differential operator Gx on the gray level image.

$$G_y = \begin{bmatrix} 1 & 2 & 1 \\ 0 & 0 & 0 \\ -1 & -2 & -1 \end{bmatrix} \quad (2)$$

Then, the sharpness measuring unit 121 detects latitudinal edge components included in the gray level image 200 by applying the differential operator Gy on the gray level image. However, here, the sharpness measuring unit 121 may instead detect the latitudinal edge components first by applying the differential operator Gy on the gray level image, and then detect the longitudinal edge components by applying the differential operator Gx.

Then, the sharpness measuring unit 121 calculates a sum total of edges $TS_{edge}$ by adding the latitudinal edge components and the longitudinal edge components together. The sharpness measuring unit 121 outputs the sum total of edges $TS_{edge}$ as the sharpness value. When image size IS represents a size of the gray scale image 200 and n denotes a number of bits, the sum total of edges $TS_{edge}$ may have a value between 0 and $IS \times 2^n$, i.e., $0 \leq T_{EDGE} < 2 \times IS \times 2^n$. For example, when IS is 640×480 and n is 8, the sum total of edges $TS_{edge}$ may have a value between 0 and $640 \times 480 \times 2^8$, i.e., $0 \leq T_{EDGE} < 640 \times 480 \times 2^8$.

Figure 3:
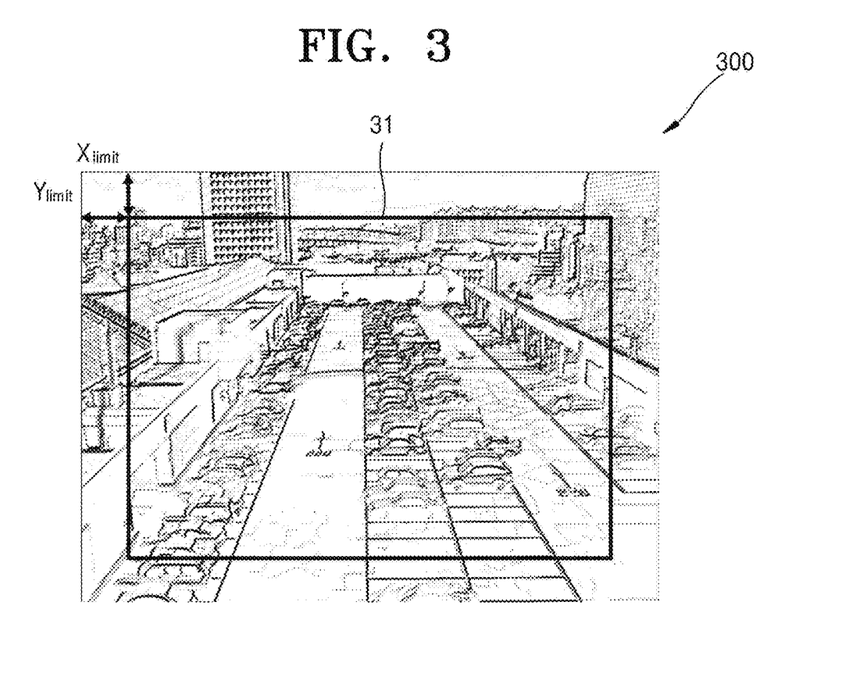
FIG. 3 is an image including edges detected by the sharpness measuring unit of FIG. 1, according to another embodiment of the present disclosure.

FIG. 3 is an image including edges detected by the sharpness measuring unit 121 of FIG. 1, according to another embodiment of the present disclosure. The operations of the sharpness measuring unit 121 will now be described with reference to FIGS. 1 and 3.

Referring to FIGS. 1 and 3, the sharpness measuring unit 121 sets a predetermined measurement area for measuring a sharpness value in a gray level image 300, and applies the Sobel filter only on the predetermined measurement area. The sharpness measuring unit 121 sets the predetermined measurement area to not include areas corresponding to the borders of the gray level image. For example, as illustrated in FIG. 3, the sharpness measuring unit 121 may set an area 31, which is $X_{limit}$ away from both the top and bottom borders of the gray level image and $Y_{limit}$ away from both the left and right borders of the gray level image, as the measurement area.

Generally, when using a camera in a continuous photographing mode, the camera may be shaken by a user, and at this time, changes on outermost areas of sequentially captured images may be significant. For example, only a person may be photographed in the center of a first photographed image, but the person may be photographed in the center and a tree may be photographed on an outer area of a second photographed image. Here, the number of edge components in the image may increase remarkably because a tree is photographed unintentionally. Accordingly, since the sharpness value of the image may be measured around a certain subject that the user is interested in, the sharpness measuring unit 121 may set the predetermined measurement area around the subject in the gray level image. In this case, the sharpness measuring unit 121 detects latitudinal edge components and longitudinal edge components by applying the Sobel filter on the predetermined measurement area of the gray level image, and outputs the sum total of the detected longitudinal and latitudinal edge components as the sharpness value. In some implementations, the Sobel filter application is limited to the predetermined measurement area.

As such, when under fixed suitable brightness and considering the sharpness values, the image having the greatest sharpness value from among the plurality of images may be suitably selected as the best or recommended image. In some implementations, the image selection is based solely on the sharpness values. Moreover, even if an error occurs due to noise, motion of a subject and brightness changes inside and outside of a camera, the best or recommended image is selected based on the sharpness value.

Referring back to FIG. 1, the brightness measuring unit 122 measures the brightness value of the gray level image that has the intensity information extracted by the intensity information extracting unit 11. The information included in the gray level image may be limited to the intensity information. The brightness value represents the brightness of an object or an image signal generated by an object, and includes luminance and value of colors. The brightness measuring unit 122 may extract the brightness information by analyzing a brightness distribution histogram of each gray level image.

Figure 4A:
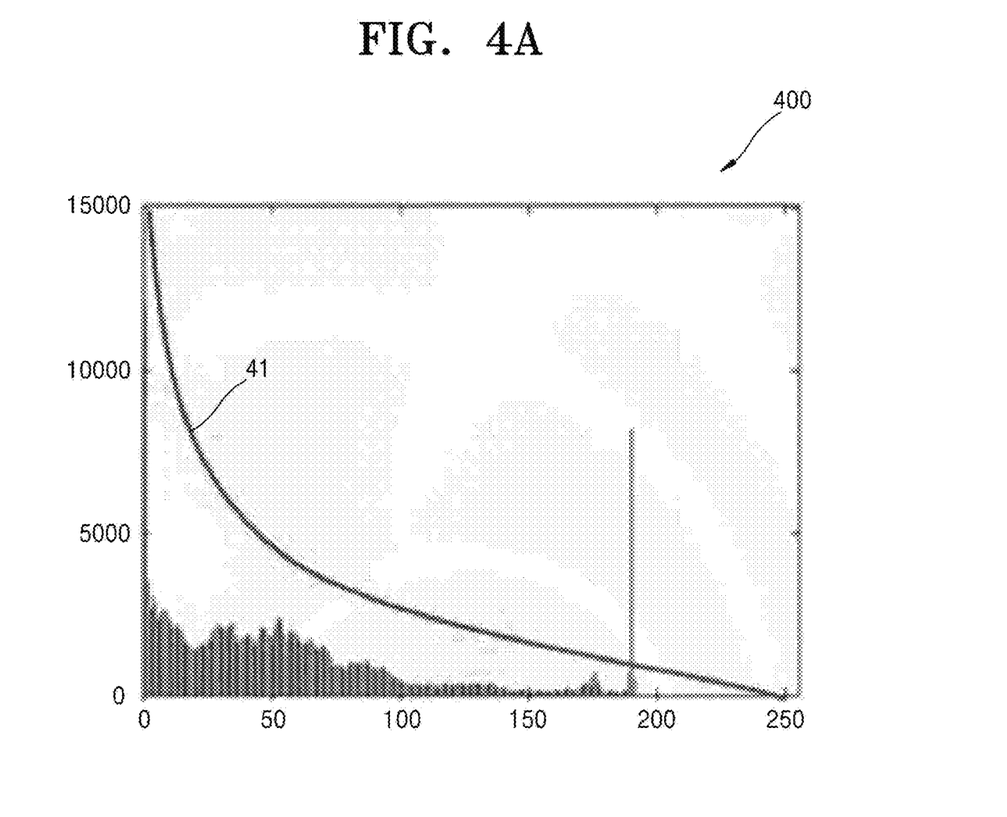
FIGS. 4A through 4C are histograms corresponding, respectively, to each of a plurality of images sequentially captured in variable brightness.
Figure 4B:
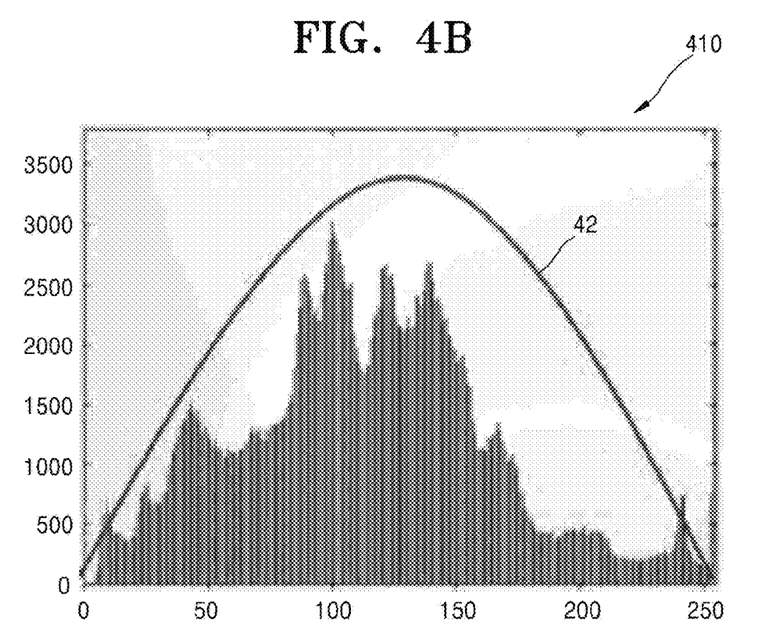
Figure 4C:
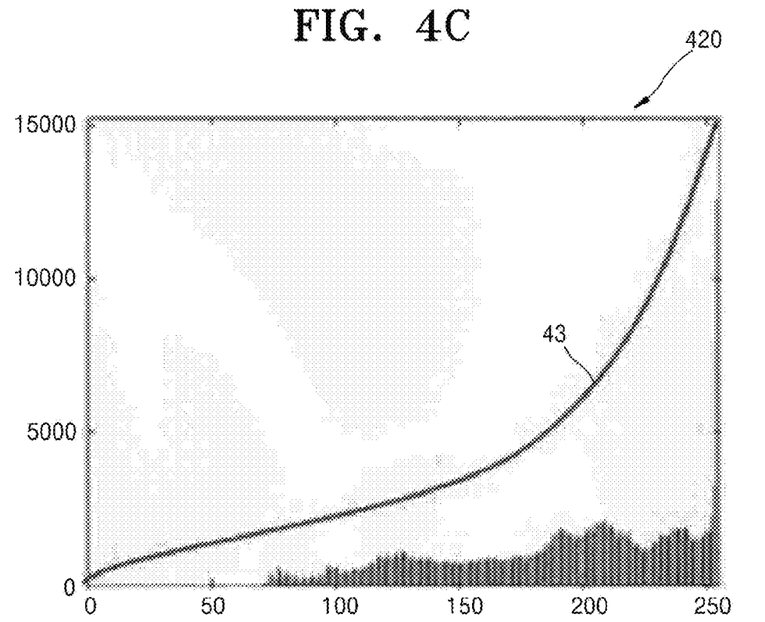

FIGS. 4A through 4C are histograms 400, 410 and 420 corresponding, respectively, to each of a plurality of images sequentially captured in variable brightness. In FIGS. 4A through 4C, a horizontal axis denotes intensity from a scale of 0 to 255, and a vertical axis denotes a number of pixels for a given value of the intensity scale.

The histogram 400 of FIG. 4A is a histogram of an image photographed in an under exposure state. In FIG. 4A, pixels are mostly distributed around black, i.e. a gray scale level of 0, and pixels are barely distributed at high gray scale. In other words, the histogram of FIG. 4A may be represented by a curve 41, because the pixels are mostly distributed at low gray scale.

The histogram 410 of FIG. 4B is a histogram of an image photographed in a perfect exposure state. The histogram of FIG. 4B may be represented by a curve 42, wherein pixels are evenly distributed at mid gray scale. An image photographed in the perfect exposure state is not only visually seen as a suitable image, but also has pixels that are evenly distributed over the entire gray scale level as shown in FIG. 4B.

The histogram 420 of FIG. 4C is a histogram of an image photographed in an over exposure state. In FIG. 4C, pixels are mostly distributed around white, i.e. a gray scale level 255, and pixels are mostly distributed at high grey scale. In other words, the histogram of FIG. 4C may be represented by a curve 43, because the pixels are mostly distributed at high gray scale.

Figure 5A:
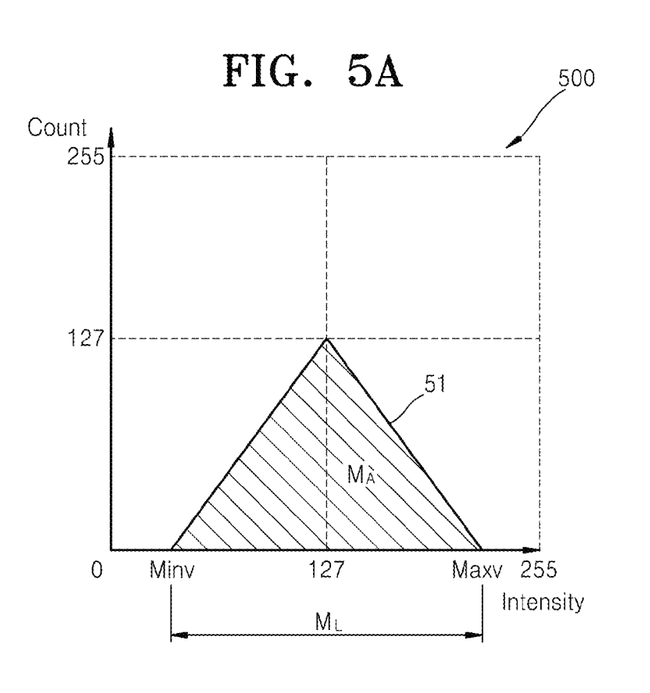
FIG. 5A illustrates an example of a mask set by a brightness measuring unit of FIG. 1.
Figure 5B:
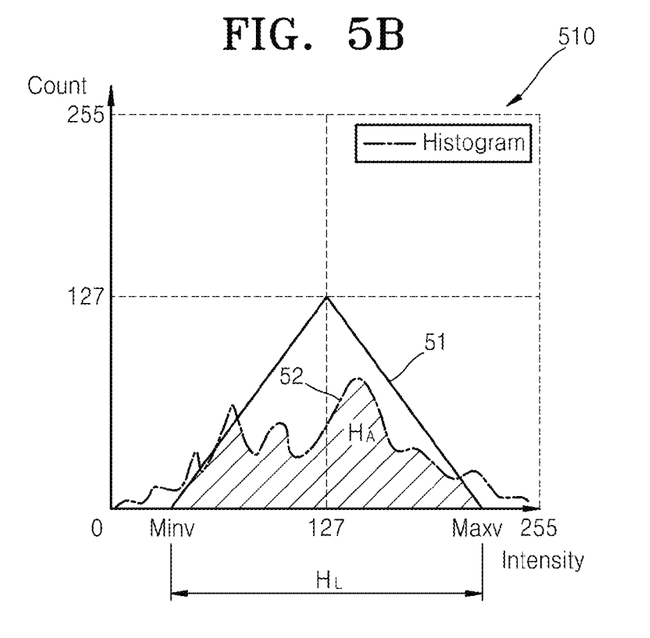
FIG. 5B is a diagram wherein the mask illustrated in FIG. 5A is applied to a histogram.

FIG. 5A is a diagram 500 for showing an example of a mask set by the brightness measuring unit 122 of FIG. 1, and FIG. 5B is a diagram 510 wherein the mask illustrated in FIG. 5A is applied to a histogram. Hereinafter, operations of the brightness measuring unit 122 will be described with reference to FIGS. 1, 5A, and 5B.

Referring to FIG. 5A, the brightness measuring unit 122 predetermines a mask 51 based on a brightness distribution histogram of an image. The mask 51 may have a triangular shape having a predetermined width with respect to the horizontal axis and a predetermined height with respect to the vertical axis. In the mask 51 of FIG. 5A, $M_L$ represents a width of the mask 51 and $M_A$ represents the area of the mask 51. The width and the height may be changed. For example, the width may be between a minimum value Minv and a maximum value Maxv, and a height may be 127. Also, the mask 51 is not limited to a triangular shape, and may have various shapes.

Referring to FIG. 5B, the brightness measuring unit 122 measures the brightness of an image by applying the mask 51 of FIG. 5A on a histogram 52 of the image. In the histogram 52, many bars (not shown) are below a dotted line but the many bars are omitted for the convenience. Here, $H_A$ represents the area of the histogram 52 included in the mask 51, and $H_L$ denotes a width of the histogram 52 included in the mask 51. The brightness measuring unit 122 may measure the brightness according to Equation 3 below.

$$L = \frac{H_A}{M_A} \times \frac{H_L}{M_L} \quad (3)$$

In Equation 3, L represents the brightness of the image, $H_A$ represents an area of a histogram, $M_A$ represents the area of a mask, $H_L$ represents a width of the histogram, $M_L$ represents a width of the mask 51. The brightness measuring unit 122 measures the brightness, L, by multiplying the ratio of the area, $H_A$, to the area, $M_A$, by the ratio of the width, $H_L$, to the width, $M_L$. Accordingly, the brightness, L, has a value from 0 to 1, i.e. $0 \leq L \leq 1$. In other words, when the mask 51 and the histogram 52 correspond completely to each other, the brightness, L, is 1. Applying the method to the histograms of FIGS. 4A to 4C, the brightness of the histograms of FIGS. 4A and 4C are small because the areas of the histograms included in the mask 51 are small, and the brightness of the histogram of FIG. 4B is great because an area of the histogram included in the mask 51 is big.

Referring back to FIG. 1, the combination unit 123 quantitatively combines the sharpness value measured by the sharpness measuring unit 121 and the brightness value measured by the brightness measuring unit 122, and outputs a combination value, CV. The combination unit 123 outputs the combination value, CV, by multiplying the sum total of the edges, $TS_{edge}$, measured by the sharpness measuring unit 121 by the brightness, L, measured by the brightness measuring unit 122. As described above, when IS denotes a size of an image and n denotes a number of bits, the sum total of the edges $TS_{edge}$ may be between 0 and $IS \times 2^n$, and the brightness may be between 0 and 1. Here, the brightness, L, operates as a weight of the sum total of the edges, $TS_{edge}$. Also, the brightness, L, and the sum total $TS_{edge}$ may each be weighted to calculate the combination value, CV.

The selection unit 13 selects the best or recommended image from among the multiple images that are sequentially captured, based on the combination value, CV, output from the combination unit 123. The selection unit 13 multiplies the sharpness value of each image by the brightness value of each image for each image, respectively, and selects the image having the greatest product as the best or recommended image.

According to an embodiment, the selection unit 13 sequentially compares a previous image and a current image of the plurality of images, and selects the image having the greater combination value, CV. To compare the selected image with a next image, from among the previous image and the current image, a corresponding value of the selected image is stored, and the comparing process is repeated for one less than the number of predetermined images. According to another embodiment, the selection unit 13 may store the images in a frame buffer, and then select the image having the greatest combination value, CV.

When the best or recommended image is selected based solely on the sharpness values of the images, the selected best or recommended image may differ based on whether a measurement area is set if an outer area of each image differs because a user shakes. However, when the best or recommended image is selected based on both the sharpness value and the brightness value, the best or recommended image is selected regardless of setting the measurement area even when the outer area of each image differs because the user shakes. Meanwhile, when the best or recommended image is selected based only on the brightness value, the best or recommended image is selected regardless of setting the measurement area even when the outer area of each image differs because the user shakes.

Figure 6:
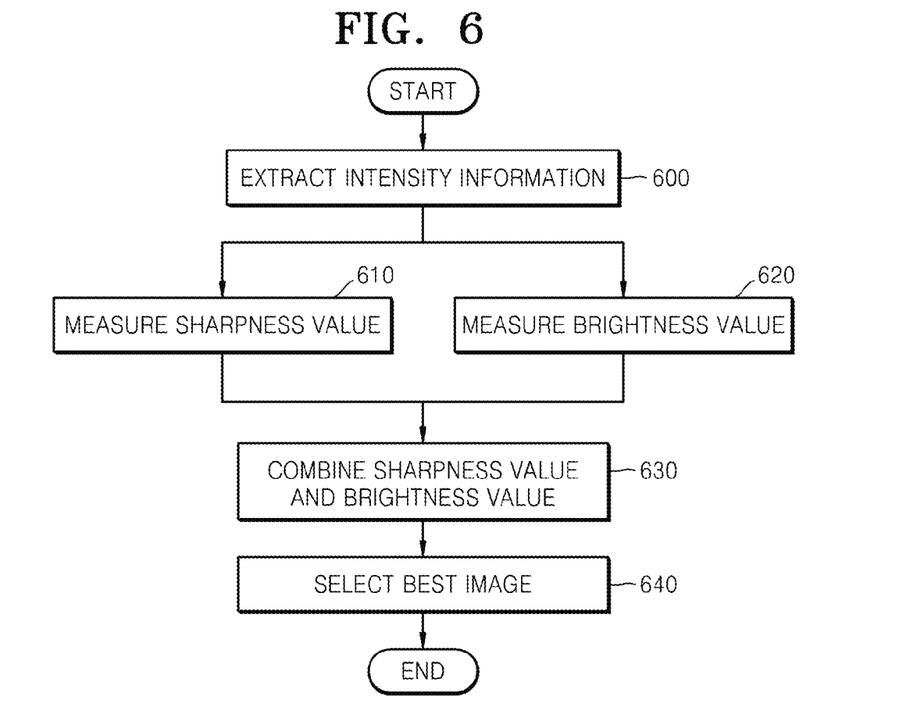
FIG. 6 is a flowchart illustrating a method of selecting the best or recommended image, according to an embodiment of the present disclosure.

FIG. 6 is a flowchart illustrating a method of selecting the best or recommended image, according to an embodiment of the present disclosure. Referring to FIG. 6, the method includes operations that are performed by the apparatus of FIG. 1. Accordingly, the details described in relation to the apparatus of FIG. 1 are also applicable to the method.

The intensity information extracting unit 11 outputs a gray level image for each of multiple images that are sequentially captured by extracting intensity information from each image (600). The sharpness measuring unit 121 measures a sharpness value for each of the gray level images (610). The brightness measuring unit 122 measures a brightness value for each of the gray level images (620). According to an embodiment, operation 610 may be performed before or after operation 620, or operations 610 and 620 may be performed simultaneously.

The combination unit 123 combines the sharpness value measured by the sharpness measuring unit 121 and the brightness value measured by the brightness measuring unit 122 for each of the gray level images (630). The selection unit 13 selects the best or recommended image from among the images based on the combination result obtained by the combination unit 123 for each of the gray level images (640).

Figure 7:
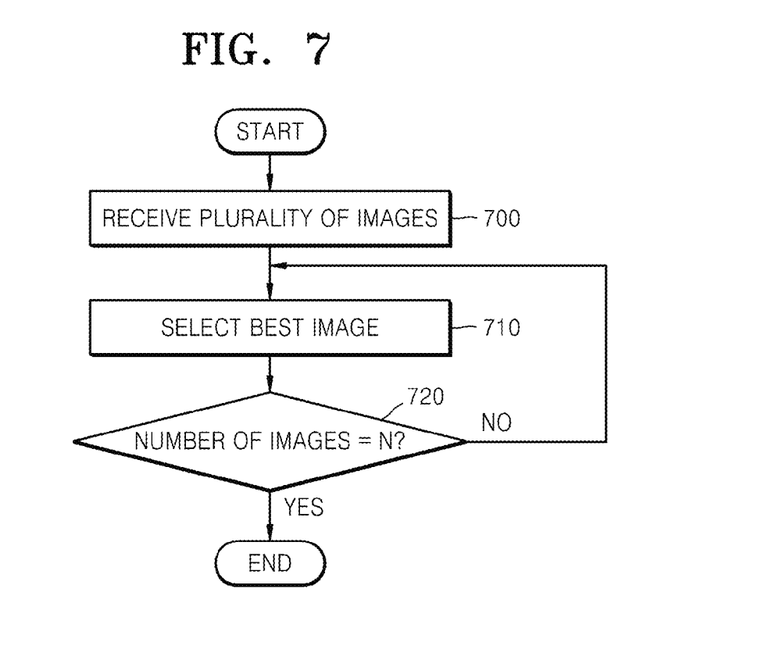
FIG. 7 is a flowchart illustrating a method of processing an image, according to an embodiment of the present disclosure.

FIG. 7 is a flowchart of a method of processing an image, according to an embodiment of the present disclosure. Referring to FIG. 7, multiple images that are sequentially captured is received (700). From the received images, the best or recommended image is selected (710). Selecting the best or recommended image corresponds to the image selection method of FIG. 6. Accordingly, the operation for selecting the best or recommended image may include extracting intensity information from images, measuring a sharpness value and a brightness value for each image, combining the sharpness value and the brightness value for each image, respectively, and selecting the best or recommended image by finding the image having the greatest combination value.

A determination is made on whether the number of received images corresponds to a predetermined number N (720). When the number of received images does not correspond to the predetermined number N, the method selects the best or recommended image (710). When the number of received images corresponds to the predetermined number N, the method ends.

The described apparatus, techniques and systems for selecting the best or recommended image may be implemented in digital cameras, portable phones installed with cameras, personal digital assistants (PDAs), or the like.

The disclosure can also be embodied as computer readable codes on a computer readable recording medium. The computer readable recording medium is any data storage device that can store data that can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

According to the present disclosure, a brightness value of a plurality of images that are sequentially captured is measured, and the best or recommended image is selected from among the plurality of images, based on the measured brightness value. Accordingly, the best or recommended image selected by the method may have minimal error due to noise, motion of a subject, brightness change inside or outside of a camera, and blurring caused by shaking hand of a user.

Also, overall processing speed is improved by extracting and using only intensity information, which is less sensitive to lighting conditions, from among a Y component indicating the intensity information and Cb and Cr components indicating chrominance information of a color image.

Moreover, an effect of an unintended edge change that may exist in an outermost area of an image can be minimized by setting a predetermined measurement area for measuring the sharpness value, and applying a Sobel filter only on the predetermined measurement area.

In addition, the present disclosure reduces hardware size, and thus can be suitably used in mobile devices, such as a digital camera, a portable phone installed with a camera, or a PDA.

While this specification contains many specifics, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Only a few implementations and examples are described and other implementations, enhancements and variations can be made based on what is described and illustrated in this application.

What is claimed is:

1. A method of selecting a recommended image from sequentially captured images performed by a digital camera which support a continuous photographing mode comprising:

extracting intensity information from each of the sequentially captured images;

measuring a brightness value for each of the sequentially captured images using the extracted intensity information;

measuring a sharpness value for each of the sequentially captured images using the extracted intensity information;

obtaining a combined value for each of the sequentially captured images by combining the measured brightness value and the measured sharpness value for each of the sequentially captured images; and selecting the recommended image from the sequentially captured images based on the obtained combined values, wherein measuring the brightness value comprises:

setting a mask having a predetermined width and height on a brightness distribution histogram of each of the sequentially captured images, and measuring the brightness value of each of the sequentially captured images by using a ratio of the brightness distribution histogram to the set mask, and wherein measuring the brightness value by using the ratio of the histogram to the set mask comprises:
   calculating a ratio of an area of the histogram included in the mask to an area of the set mask,
   calculating a ratio of a width of the histogram included in the mask to a width of the et mask, and
   measuring the brightness value based on the ratio of the areas with the ratio of the widths,
   wherein a shape of the mask is determined according to the brightness distribution of the histogram,
   wherein the sharpness value is measured within a measurement area for each of the sequentially captured images, and
   wherein the measurement area is set around a certain subject in each of the sequentially captured images.

2. The method of claim 1, wherein measuring the sharpness value comprises:
   detecting longitudinal edge components and latitudinal edge components of each of the sequentially captured images; and
   measuring the sharpness value for each image by calculating a sum total of the longitudinal edge components and the latitudinal edge components for each image.

3. The method of claim 2, wherein, the recommended image is selected based on values obtained by multiplying the sum totals of the longitudinal edge components and the latitudinal edge components for each of the sequentially captured images by the measured brightness value for each of the sequentially captured images, respectively.

4. The method of claim 1, wherein selecting the recommended image is performed in real time according to an order of the sequentially captured images.

5. A non-transitory computer readable recording medium embodied with instructions to cause a data processing apparatus to select the recommended image from sequentially captured images performed by a digital camera which support a continuous photographing mode, comprising:
   extracting intensity information from each of the sequentially captured images;
   measuring a brightness value for each image using the extracted intensity information;
   measuring a sharpness value for each image using the extracted intensity information;
   obtaining a combined value for each image by combining the measured brightness value and the measured sharpness value for each image; and
   selecting the recommended image from the sequentially captured images based on the obtained combined values,
   wherein measuring the brightness value comprises:
      setting a mask having a predetermined width and height on a brightness distribution histogram of each of the sequentially captured images, and
      measuring the brightness value of each of the sequentially captured images by using a ratio of the brightness distribution histogram to the set mask,
   and wherein measuring the brightness value by using the ratio of the histogram to the set mask comprises:
      calculating a ratio of an area of the histogram included in the mask to an area of the set mask,
      calculating a ratio of a width of the histogram included in the mask to a width of the set mask, and
      measuring the brightness value based on the ratio of the areas with the ratio of the widths,
      wherein a shape of the mask is determined according to the brightness distribution of the histogram,
      wherein the sharpness value is measured within a measurement area for each of the sequentially captured images, and
      wherein the measurement area is set around a certain subject in each of the sequentially captured images.

6. A computing system with processor having a plurality of processing units for selecting the recommended image from sequentially captured images by a continuous photographing mode, the apparatus comprising:
   a brightness measuring unit configured to measure a brightness value for each image;
   a sharpness measuring unit configured to measure a sharpness value for each image;
   a combination unit configured to obtain a combined value for each image by combining the measured brightness value with the measured sharpness value for each image;
   a selection unit configured to select the recommended image from the sequentially captured images based on the obtained combined values; and
   an intensity information extracting unit configured to extract intensity information from each image,
   wherein the brightness measuring unit is configured to measure the brightness value for each image using the extracted intensity information, and
   the sharpness measuring unit is configured to measure the sharpness value for each image using the extracted intensity information,
   wherein the brightness measuring unit is configured to set a mask having a predetermined width and height on a brightness distribution histogram of each image, and measure the brightness value of each image by using a ratio of the brightness distribution histogram to the set mask,
   and wherein the brightness measuring unit is configured to calculate a ratio of an area of the histogram included in the mask to an area of the set mask, calculate a ratio of a width of the histogram included in the mask to a width of the set mask, and measure the brightness value based on the ratio of the areas with the ratio of the widths,
   wherein a shape of the mask is determined according to the brightness distribution of the histogram,
   wherein the sharpness value is measured within a measurement area for each of the sequentially captured images, and
   wherein the measurement area is set around a certain subject in each of the sequentially captured images.

7. The system of claim 6, further comprising an area setting unit configured to set a measurement area for each image,
   wherein the sharpness measuring unit is configured to measure the sharpness value within the set measurement area for each image.

8. The system of claim 6, wherein the sharpness measuring unit is configured to detect longitudinal edge components and latitudinal edge components of each image, and measures the sharpness value for each image by calculating a sum total of the longitudinal edge components and the latitudinal edge components.

9. The system of claim 8, wherein the selection unit is configured to select the recommended image based on values obtained by multiplying the sum totals of the longitudinal edge components and the latitudinal edge components for each image by the measured brightness value for each image.

10. The system of claim 6, wherein the selection unit is configured to select the recommended image in real time according to an order of the sequentially captured images.

* * * * *